W. H. WRIGHT.
ANTIFRICTION BEARING.
APPLICATION FILED MAY 29, 1914.
1,194,917.
Patented Aug. 15, 1916.
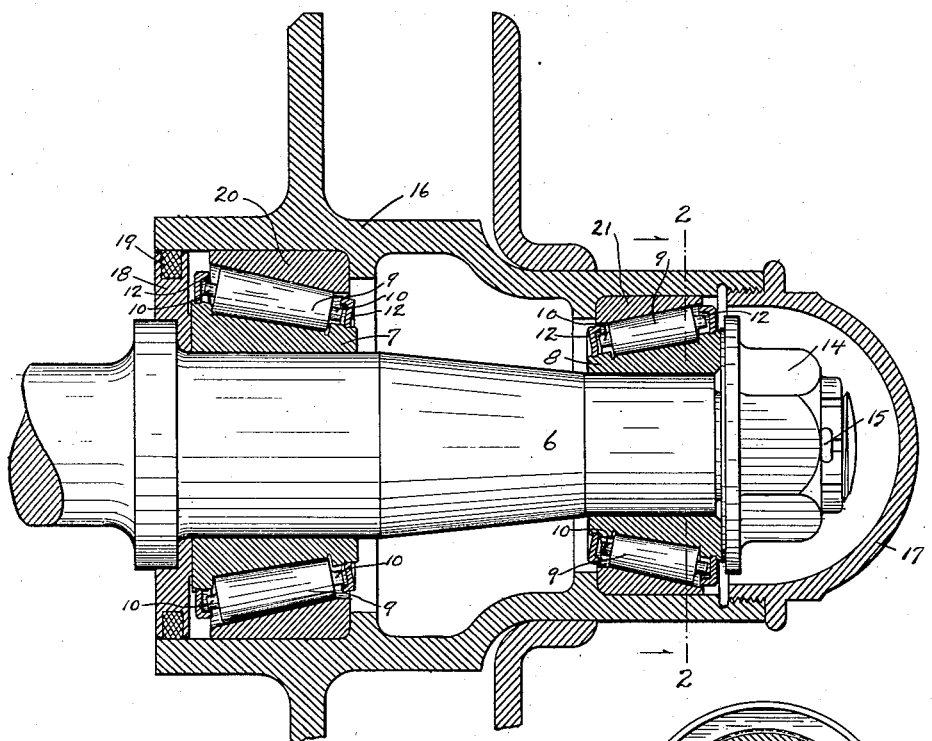
Fig. 1.
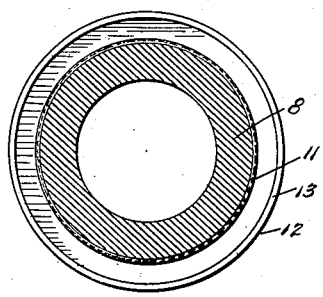
Fig. 2.
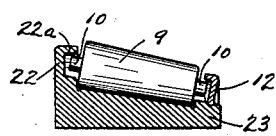
Fig. 3.
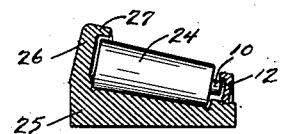
Fig. 4.
Fig. 5.
WITNESSES:
INVENTOR
William Hamilton Wright
BY
J. W. Ellis
ATTORNEY

UNITED STATES PATENT OFFICE.

WILLIAM HAMILTON WRIGHT, OF PORT DOVER, ONTARIO, CANADA, ASSIGNOR TO MARY ELIZABETH WRIGHT, OF PORT DOVER, ONTARIO, CANADA.

ANTIFRICTION-BEARING.

1,194,917.   Specification of Letters Patent.   Patented Aug. 15, 1916.

Application filed May 29, 1914.   Serial No. 841,839.

*To all whom it may concern:*

Be it known that I, WILLIAM HAMILTON WRIGHT, a citizen of the United States of America, and a resident of the town of Port Dover, county of Norfolk, and Province of Ontario, Canada, have invented certain new and useful Improvements in Antifriction-Bearings, of which the following is a full, clear, and exact description.

My invention relates generally to antifriction bearings, and more particularly to that type of bearing in which tapered rollers, having their peripheries in contact, are employed.

The general object of my invention has been to provide a bearing, which shall be simple and cheap to manufacture, and one which shall not easily get out of order or adjustment. Moreover, I have sought to provide retainer rings for the rollers which shall be easily and permanently secured to the bearing rings, thus dispensing with all screw-threaded retaining means.

The above objects and advantages have been accomplished by the device shown in the accompanying drawings, which form a part of this specification and in which like characters of reference indicate like parts throughout the several views, of which:

Figure 1 is a longitudinal section of my bearing taken on the center line thereof. Fig. 2 is a sectional elevation of the inner bearing cone and is taken on line 2—2 of Fig. 1. Fig. 3 is an enlarged fragmentary view showing one of the retainer rings and its manner of attachment to the bearing cone. Fig. 4 is a sectional view of a modified form of the bearing cone. Fig. 5 is a sectional view of another modified form of the bearing cone and a modified form of roller.

In the drawings, 6 represents the shaft of my device. This shaft is screw-threaded at its outer end and provided with an adjusting castle nut 14, which is securely held in its adjusted position by means of a cotter pin 15 passing through the shaft and arranged in the slots of the nut. By means of this adjusting nut, one of the bearing rings may be moved axially on the shaft and thereby adjust the entire bearing.

Carried by the shaft 6 are inner bearing cones 7 and 8, preferably secured to said shaft in a non-rotatable manner. These cones form a tread or race for the rollers 9 of my bearing, which are arranged about the cones. These rollers have smooth tapering peripheries and are preferably provided at each end with a retaining pin 10. At each end of the bearing cones 7 and 8 is provided an annular groove 11, in which is arranged a solid annular retaining ring 12, having when in place an inner diameter substantially the same as the diameter of the bottom of said groove. Before the rings 12 are placed in the positions shown in the drawings they are made with a diameter slightly less than the diameter of the bottoms of the grooves and with a thickness slightly less than the widths of the grooves. They are then expanded by heat and each one is slipped over the end of one of the bearing cones until it is immediately in line with the groove. It is then cooled in any suitable way and thereby contracted. Since the diameter of the ring before it is slipped into place is less than the diameter of the bottom of the groove and the thickness of the ring is less than the width of the groove, when the ring is contracted by cooling, the surplus of metal in the body of the ring expands until it fills the groove and locks it against rotation and lateral movement. Each of these retaining rings is shrunk into place and is provided with an overhanging lip or flange 13, which extends inwardly and projects over the outer ends of the shafts 10 provided on the rollers, thus acting to retain the rollers and to prevent them from becoming loose or dropping out of the bearing cone when the bearing is assembled.

16 is the wheel hub, which is arranged about the bearing and forms a casing for the same. This hub is interiorly screw-threaded at its outer end and provided with a screw-threaded cap 17. At the inner end of the hub is arranged a lubricant retaining disk 18. This disk is arranged about the shaft 6 and is provided on its outer periphery with a suitable packing means 19, which serves not only to retain the lubrication, but also to exclude dust from the bearing.

Carried by the hub 16 are the outer bearing cones 20 and 21, which are arranged about the inner bearing cones 7 and 8 respectively. The bearing cones of my device are each provided with a tapering race or tread, which coincide with the tapering rolling surfaces of the rollers 9 disposed between said cones when the bearing is assembled.

The inner bearing cone 23, shown in the modified form in Fig. 4, is provided with an inner retainer ring 12 secured to the ring in a similar manner to that shown in Fig. 1. The cone is also provided with an integral outer retainer ring 22, having an inwardly extending lip or flange 22ª, which overhangs the pins 10 on the larger ends of the rollers.

In the modified construction shown in Fig. 5, the roller 24 is provided only at its inner end with a retaining pin 10, the outer end being smooth. The inner bearing cone 25, in this form, is provided with an integral outer retainer ring 26, which extends upwardly from the tread of the cone for a distance slightly greater than the diameter of the larger end of the roller 24, where it is provided with an inwardly projecting lip or flange 27, which overhangs the outer end of the roller.

It will be clear from the above description that when the solid retainer rings 12 are once shrunk into place within their grooves 11, formed in the inner bearing cones 7 and 8, that they are substantially integral with the bearing cones thus being securely held in position.

Clearly my invention may be advantageously employed in connection with antifriction roller bearings of other types than those specifically shown and described herein.

Having thus described my invention, what I claim is:

1. An anti-friction bearing comprising an inner bearing cone and an outer bearing cone, rollers disposed between said bearing cones, one of said bearing cones being provided with an annular groove, and a solid retainer ring contracted tightly upon the bottom of the groove and rigidly held in the groove against rotation and lateral movement.

2. An anti-friction bearing comprising an inner bearing cone and an outer bearing cone, rollers disposed between said bearing cones, one of said bearing cones being provided with an annular groove, and a solid retainer ring provided with an inwardly projecting lip, said retainer ring contracted tightly upon the bottom and sides of the groove and being rigidly held in the groove against rotation and lateral movement.

3. An anti-friction bearing comprising an inner bearing cone and an outer bearing cone, rollers disposed between said bearing cones, said inner bearing cone being provided with an annular groove at each end thereof, and a solid retainer ring contracted tightly upon the bottom of the groove and being rigidly held in the groove against rotation and lateral movement.

In testimony whereof, I have hereunto signed my name in the presence of two subscribing witnesses.

WILLIAM HAMILTON WRIGHT.

Witnesses:
 WM. ELLIS,
 WALTER H. KELLEY.